G. A. WALTON.
STEAM GENERATOR.
APPLICATION FILED APR. 23, 1902. RENEWED JULY 1, 1908.
910,615.
Patented Jan. 26, 1909.
2 SHEETS—SHEET 1.
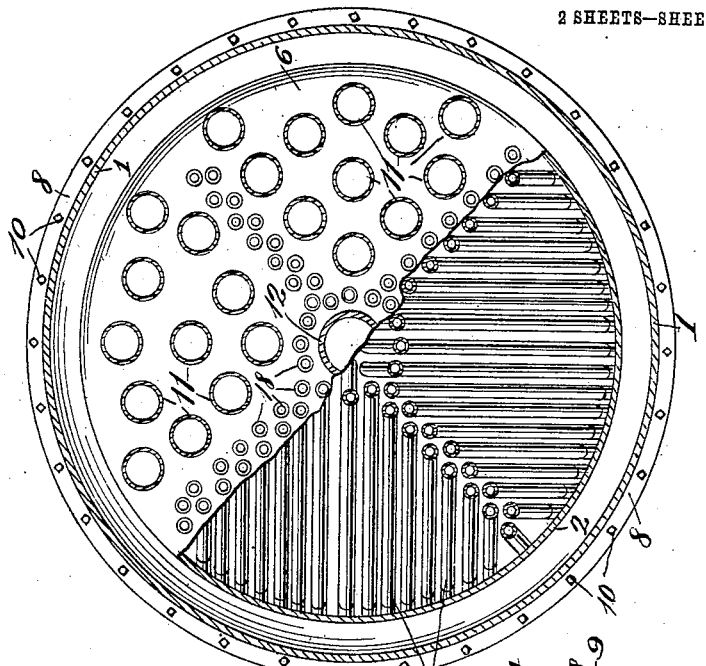
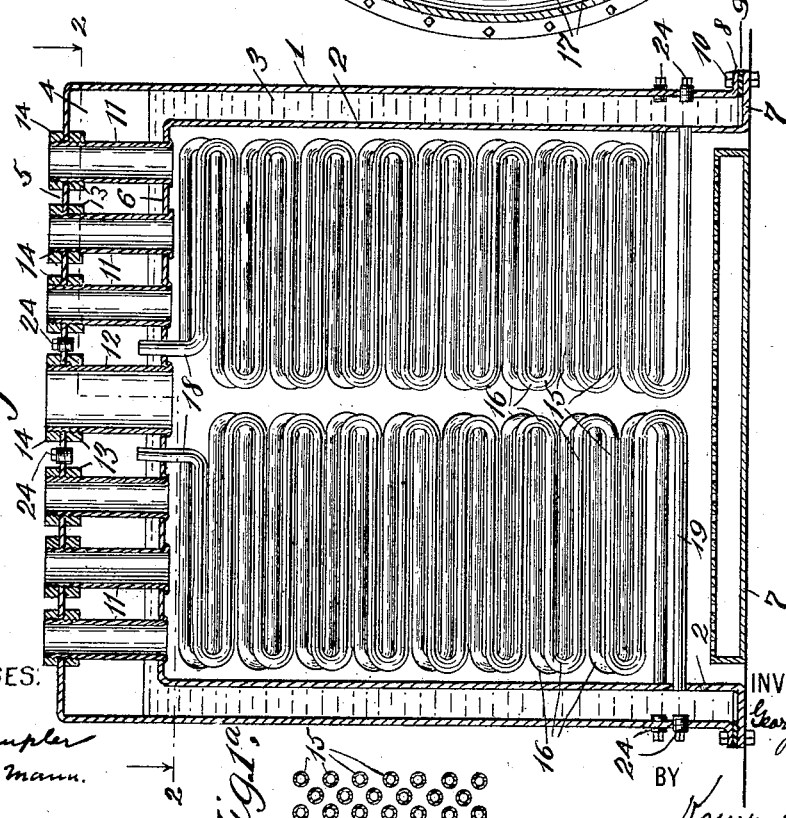
WITNESSES:
INVENTOR
George A. Walton
BY
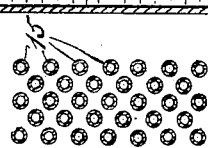
ATTORNEY G. A. WALTON.
STEAM GENERATOR.
APPLICATION FILED APR. 23, 1902. RENEWED JULY 1, 1908.
910,615.
Patented Jan. 26, 1909.
2 SHEETS—SHEET 2.
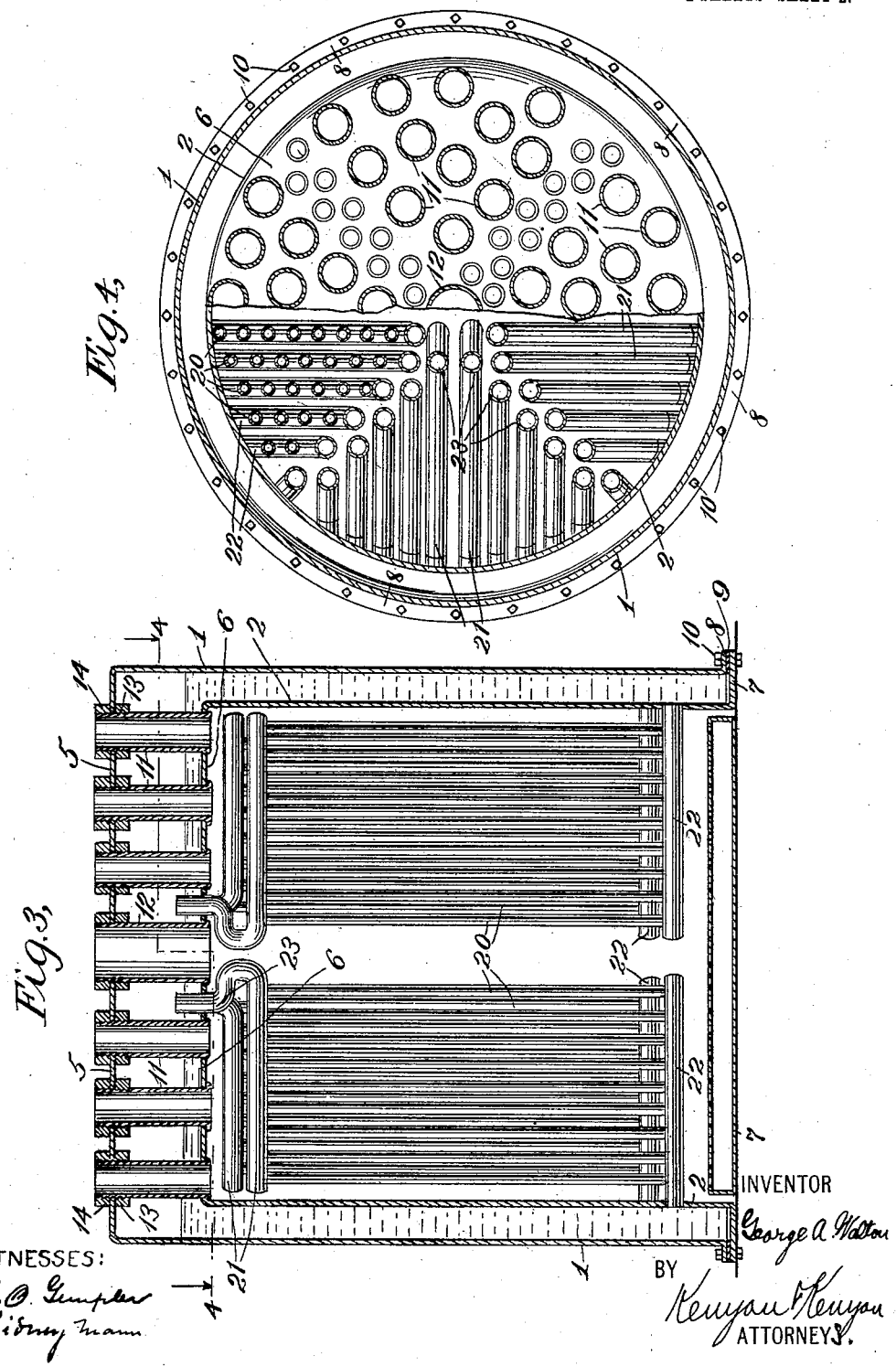

UNITED STATES PATENT OFFICE.

GEORGE A. WALTON, OF NEW YORK, N. Y.

STEAM-GENERATOR.

No. 910,615.  Specification of Letters Patent.  Patented Jan. 26, 1909.

Application filed April 23, 1902, Serial No. 104,243. Renewed July 1, 1908. Serial No. 441,369.

*To all whom it may concern:*

Be it known that I, GEORGE A. WALTON, a subject of the United Kingdom of Great Britain, and a resident of the city, county, and State of New York, have invented certain new and useful Improvements in Steam-Generators, of which the following is a specification.

My invention relates to steam generators, and particularly to that class of steam generators or boilers in which the heating surface is largely composed of a multiplicity of tubular generator elements arranged in the combustion chamber.

An object of the invention is to provide a construction which has a great area of heating surface in proportion to the size of the generator and in proportion to the volume of the inclosed space; also to provide a construction in which the heat developed in the combustion chamber will be uniformly distributed throughout the heating surfaces and perfectly absorbed, a great evaporative efficiency and power being thereby developed in a generator of a given size and weight.

Other objects of the invention are to provide a generator which is simple and cheap in construction, and one which may be easily cleaned and readily taken apart and repaired.

These and other objects of my invention will more fully appear in the following description.

My invention consists in the novel improvements and features of construction shown and described.

The accompanying drawings, which are referred to herein and form a part hereof, illustrate two embodiments of my invention and serve in connection with the description herein, to explain the principles thereof and the best mode contemplated by me of applying those principles.

Of the drawings, Figure 1 is a vertical central section of a generator constructed in accordance with my invention; Fig. 1ª is a vertical sectional view illustrating a detail of the construction; Fig. 2 is a transverse sectional view taken on the line 2—2 of Fig. 1; Fig. 3 is a view similar to that shown in Fig. 1 illustrating another form of generator embodying the invention; and Fig. 4 is a sectional view of the same taken on the line 4—4 of Fig. 3.

A generator constructed in accordance with my invention comprises a lower annular portion forming the side walls of the combustion chamber and the main water space of the generator, and an upper drum portion communicating with the lower portion and forming the top of the combustion chamber and the main steam space of the generator. A plurality of flues for the escape of the products of combustion from the combustion chamber extend through the steam space and communicate with the combustion chamber at the top thereof. A plurality of tubular steam generating elements are arranged in the combustion chamber, each communicating at its lower end with the water space, and at its upper end with the steam space, the points of connection between the upper ends of the said elements and the shell being so distributed as to form spaces for the flues. In accordance with the preferred construction, each of the steam generating elements communicate with the steam space at a single point, and these points of communication are arranged in radial lines so as to form segmental spaces in which the flues may be distributed in a uniform manner.

Referring now to the drawings in detail, and at first to the form of device illustrated in Figs. 1 and 2, the main shell of the generator consists of two inverted cup-shaped shell portions arranged one within the other. The upright of the vertical cylindrical portion 1 of the outer shell has a greater diameter and is longer than the corresponding portion 2 of the inner shell, there being thus formed between the said upright portions of the shells an annular chamber 3, which has free communication at its upper end with the cylindrical chamber 4 formed between the head 5 of the outer shell and the head 6 of the inner shell. Each of the shells is preferably provided at its lower edge with an outturned flange, the flange 7 of the inner shell being enough wider than the flange 8 of the outer shell to close the lower end of the chamber 3. The flanges 7 and 8 are secured together, with an interposed packing 9 of suitable material, by means of a row of bolts 10.

The heads 5 and 6 of the two shells are provided with a suitable number of registering perforations, in which are secured a number of substantially uniformly distributed flues 11. A central flue 12, which may be somewhat larger than the flues 11 is preferably provided. Each of the flues 11 and 12 are expanded into the perforations in the head 6 of the inner shell and are removably connected to the head 5 of the outer shell by any suitable means, as by the nuts 13 and 14, which are threaded on to the upper ends of the flues. The inner nuts 13 are arranged to engage the inner surface of the head 5, and the outer nuts 14 are arranged to engage the outer surface of the said head. It will be seen that by removing the outer nuts 14 and the bolts 10, the outer shell may be removed from the inner shell, thus exposing the entire surface of the latter.

As far as the feature of my invention relating to the construction of the shell is concerned, any suitable form of steam generating element may be arranged in the combustion chamber. Preferably, however, I employ a steam generating element having a plurality of parallel tube portions connected together so as to lie in substantially a single plane. Preferably, also, the steam generating elements are arranged in the combustion chamber side by side in parallel planes in such relative positions that the parallel tube portions of each element are staggered with relation to the corresponding tube portions of the adjacent element. In order that suitable spaces may be provided for the flues 11, each of the steam generating elements has but a single point of connection with the head 6 of the inner shell portion of the generator, and these points of connection are arranged in radial lines. To facilitate this construction, the steam generating elements are preferably arranged in a plurality of segmental groups, the elements in each group being arranged parallel with each other.

In accordance with the construction shown in Figs. 1 and 2, each of the steam generating elements is provided with a plurality of horizontal tube portions 15 alternately connected at their opposite ends by return bends 16 to form a single sinuous or serpentine passage, as shown. The upper horizontal tube portion 17 of each element is provided with an upwardly extending portion which is secured in a suitable opening in the head 6. The lower horizontal portion 19 is connected with the lower portion of the vertical part 2 of the inner shell. The adjacent elements are closely arranged side by side, and the horizontal tube portions thereof are vertically staggered with relation to each other, so that the horizontal tube portions of one element are arranged opposite to the spaces between the horizontal portions of the adjacent elements. This arrangement is clearly illustrated in Figs. 1 and 1ª. By reason of this arrangement, the products of combustion in passing up between the elements are deflected back and forth between the horizontal portions of adjacent elements, and are thus rapidly brought into contact with the heating surfaces before they finally escape through the flues 11 and 12. A very efficient absorption of the heat of the products of combustion is thus attained.

As shown in Fig. 2, the steam generating elements are arranged in four segmental groups, each occupying substantially one-fourth of the space in the combustion chamber. The points of connection between the elements of each group and the plate 6 are arranged in radial lines along the sides of the group, the points of connection along the adjacent sides of the groups being arranged side by side in parallel lines. This construction and arrangement of the steam generating elements I regard as an important feature of my invention, and it is obvious that this feature of the invention may be employed in connection with generators having a different type of shell forming the main water and steam spaces of the generator.

In accordance with the construction shown in Figs. 3 and 4, the steam generating elements each consist of a plurality of parallel vertical tube portions 20, which are connected at their upper and lower ends by the headers 21 and 22 respectively. The upper headers 21 are each provided with upwardly extending portions 23, which are secured in suitable openings in the head 6. The lower headers 22 are connected at one of their ends with the lower part of the vertical wall 2 of the inner shell portion. The headers 21 and 22 of the adjacent elements being necessarily somewhat larger than the vertical tube portions 20, are vertically offset or staggered with relation to each other, so that the elements may be brought closer together than would otherwise be possible, as indicated in Fig. 3. The vertical tube portions 20 of the adjacent elements in this form of the device, are preferably offset or staggered with relation to each other in lateral directions, as shown in the upper part of Fig. 4, the object being to get a more equal distribution of the heating surfaces, and consequently, a more complete absorption of the heat from the products of combustion. The steam generating elements in this form of the device are also preferably arranged in segmental groups, the points of connection of the elements in each group being arranged along the radial sides of the group, as clearly shown in Fig. 4.

Any suitable burner may be used for supplying fuel to the combustion chamber. Preferably, however, a burner is used which gives a substantially even distribution of the flame throughout the entire area of the combustion chamber.

It will be seen that there are but comparatively few joints of a generator constructed in accordance with my invention as compared with the amount of heating surface provided. This is especially true of the form of the device shown in Figs. 1 and 2, in which each of the steam generating elements is preferably formed by suitably bending a single piece of pipe. By removing the bolts 10 and the nuts 14, and the outer shell of the generator, all the points of connection between the inner shell and the steam generating elements may be reached by the ordinary tools, so that loose joints may be easily tightened, and if necessary, any of the elements may be removed, and replaced by new elements. The outer shell of a generator may be, and preferably is, provided with an opening opposite each end of each of the generating elements, said openings being closed by screw-threaded plugs 24. Where it is not desired to remove the outer shell of the generator, access may be had through these openings to the points of connection between the generator elements and the shell to either tighten the same or to remove the elements and replace them by new ones.

By carrying the upwardly extending portions of the steam generating elements a short distance above the head 6, the normal water level in the generator may be kept at some point above the said head, as indicated in the drawings, without causing the steam delivered by the steam generating elements to pass through the water, and thus become saturated.

My invention, in its broader aspects, is not limited to the precise construction shown, nor to the particular construction by which it may be carried into effect, as many minor changes may be made in the construction without departing from the main principles of the invention and without sacrificing its chief advantages.

Having thus described my invention, what I desire to secure by Letters Patent is:

1. In a steam generator, the combination with a shell having a lower annular portion forming the water space of the generator and an upper drum portion forming the steam space, of a plurality of tubular steam generating elements communicating at their lower ends with the water space and at their upper ends with the steam space, the points of connection between the drum portion and said elements being arranged in a plurality of segmental groups.

2. In a steam generator, the combination with a shell having a lower annular portion forming the water space of the generator and an upper drum portion forming the steam space, of a plurality of tubular steam generating elements communicating at their lower ends with the water space and at their upper ends with the steam space, said elements being arranged in a plurality of segmental groups in each of which the elements are arranged side by side in parallel planes.

3. In a steam generator, the combination with a shell having a lower annular portion forming the water space of the generator, and an upper drum portion forming the steam space, of a plurality of flues extending through the steam space, and a plurality of tubular steam generating elements communicating at their lower ends with the water space and at their upper ends with the steam space, said elements being arranged in a plurality of segmental groups, the points of connection between the upper ends of the elements of each group and the shell being distributed in radial lines so as to form space for said flues.

4. In a steam generator, the combination with a shell having a lower annular portion forming the water space of the generator, and an upper drum portion forming the steam space, of a plurality of flues extending through the steam space, and a plurality of tubular steam generating elements each formed in substantially a single plane, said elements being arranged in a plurality of segmental groups in each of which the elements are arranged side by side in parallel planes and are connected at their lower ends to the water space and at their upper ends to the steam space, the points of connection between the upper ends of each group of elements and the shell being so distributed as to form space for said flues.

5. In a steam generator, the combination with a shell having a lower annular portion forming the water space of the generator and inclosing the combustion chamber, and a drum portion forming the steam space, of a multiplicity of tubular steam generating elements distributed uniformly throughout the upper part of the combustion chamber so that the heated gases are uniformly acted upon thereby, said elements communicating at their lower ends with the water space and at their upper ends independently of each other with the steam space, each element having a plurality of tube portions all lying in a single plane, said elements being arranged in a plurality of groups with the elements of each group located side by side in parallel planes.

6. In a steam generator, the combination with a shell having a lower annular portion forming the water space of the generator and inclosing the combustion chamber, and an upper drum portion forming the steam space, of a multiplicity of tubular steam generating elements distributed throughaut the upper part of the combustion chamber so that the heated gases are uniformly acted upon thereby, said elements communicating at their lower ends with the water space and at their upper ends independently of each other with the steam space, each element having a plurality of tube portions all lying in a single plane, said elements being arranged in a plurality of groups with the elements of each group located side by side in parallel planes with the parallel portions of adjacent elements staggered with relation to each other.

7. In a steam generator, the combination with a shell having a lower annular portion forming the water space of the generator, and inclosing the combustion chamber, and an upper drum portion forming the steam space, of a multiplicity of flues extending through the steam space, and a multiplicity of tubular steam generating elements distributed uniformly throughout the upper part of the combustion chamber so that the heated gases are uniformly acted upon thereby, each element having a plurality of parallel tube portions all lying in the same plane, said elements being arranged in a plurality of groups with the elements of each group located side by side in parallel planes with the parallel tube portions of adjacent elements staggered with relation to each other, each element being connected at its lower end to the water space and at its upper end with the steam space, the points of connection between the upper ends of the elements and the shell being so distributed as to form spaces for said flues.

8. In a steam generator, the combination with a shell having a lower annular portion forming the water space of the generator, and an upper drum portion forming the steam space, of a multiplicity of flues extending through the steam space and a multiplicity of tubular steam generating elements distributed uniformly throughout the upper part of the combustion chamber so that the heated gases are uniformly acted upon thereby, each element having a plurality of tube portions all lying in the same plane, said elements being arranged in a plurality of groups with the elements of each group located side by side in parallel planes with the tube portions of adjacent elements staggered with relation to each other, each element having at its lower end a single point of connection with the lower end of the water space and at its upper end a single point of connection with the steam space, the points of connection between the upper ends of the elements and the shell being so distributed as to form spaces for said flues.

9. In a steam generator, the combination with a shell having a lower annular portion forming the water space of the generator, and an upper drum portion forming the steam space, of a plurality of flues extending through the steam space, and a plurality of tubular steam generating elements, each element having a plurality of horizontal tube portions lying in the same plane, said elements being arranged side by side in parallel planes with the horizontal tube portions of adjacent elements staggered with relation to each other, each element having at its lower end a single point of connection with the lower end of the water space and at its upper end a single point of connection with the steam space, the points of connection between the upper ends of the elements and the shell being so distributed as to form space for the flues.

10. In a steam generator, the combination with a shell having a lower annular portion forming the water space of the generator, and an upper drum portion forming the steam space, of a plurality of flues extending through the steam space, and a plurality of tubular steam generating elements, each element having a plurality of horizontal tube portions lying in the same plane and alternately connected at their opposite ends so as to form a single serpentine passage, said elements being arranged side by side in parallel planes with the horizontal portions of adjacent elements staggered with relation to each other, each element having at its lower end a single point of connection with the water space at its upper end a single point of connection with the steam space, the points of connection between the upper ends of the elements and the shell being so distributed as to form space for the flues.

11. In a steam generator, the combination with a shell having a lower annular portion forming the water space of the generator, and an upper drum portion forming the steam space, of a plurality of flues extending through the steam space, and a plurality of tubular steam generating elements, each element having a plurality of parallel tube portions lying in the same plane, said elements being arranged in a plurality of segmental groups in each of which the elements are arranged side by side in parallel planes with the parallel tube portions of adjacent elements staggered in relation to each other, each element having at its lower end a single point of connection with the water space and at its upper end a single point of connection with the steam space, the points of connection between the upper ends of each group of elements and the shell being so distributed as to form space for a plurality of said flues.

12. In a steam generator, the combination with a shell having a lower annular portion forming the water space of the generator, and an upper drum portion forming the steam space, of a plurality of flues extending through the steam space, and a plurality of tubular steam generating elements, each element having a plurality of horizontal tube portions lying in the same plane, said elements being arranged in a plurality of segmental groups in each of which the elements are arranged side by side in parallel planes with the horizontal tube portions of adjacent elements staggered in relation to each other, each element having at its lower end a single point of connection with the water space, and at its upper end a single point of connection with the steam space, the points of connection between the upper ends of each group and the shell being so distributed as to form space for a plurality of said flues.

13. In a steam generator, the combination with a shell having a lower annular portion forming the water space of the generator, and an upper drum portion forming the steam space, of a plurality of flues extending through the steam space, and a plurality of tubular steam generating elements, each element having a plurality of horizontal portions lying in the same plane and alternately connected at their opposite ends so as to form a single serpentine passage, said elements being arranged in a plurality of segmental groups in each of which the elements are located side by side in parallel planes with the horizontal tube portions of adjacent elements staggered with relation to each other, each element having at its lower end a single point of connection with the lower end of the water space and at its upper end a single point of connection with the steam space, the points of connection between the upper ends of each group and the shell being so distributed as to form space for a plurality of said flues.

14. In a steam generator having a lower water space and an upper steam space connected to the water space by means permitting free gravitation of water to the latter, a heating chamber arranged in coöperative relation thereto, the combination of a multiplicity of steam generating elements distributed uniformly throughout the upper part of the heating chamber so that the heating agent is uniformly acted upon thereby, said elements communicating at their lower ends independently of each other with the water space and at their upper ends independently of each other with the steam space, each having a plurality of closely arranged tube portions all lying in the same plane, said elements being arranged in a plurality of groups with the elements of each group located side by side in parallel planes.

15. In a steam generator having a lower water space and an upper steam space connected to the water space by means permitting free gravitation of water to the latter, and a heating chamber arranged in coöperative relation thereto, the combination of a plurality of steam generating elements distributed uniformly throughout the upper part of the heating chamber so that the heating agent is uniformly acted upon thereby, said elements communicating at their lower ends with the water space and at their upper ends independently of each other with the steam space, each having a plurality of closely arranged parallel tube portions all lying in the same plane, said elements being arranged in a plurality of groups with the elements of each group located side by side in parallel planes with the parallel tube portions of adjacent elements staggered with relation to each other.

16. In a steam generator having a lower water space and an upper steam space connected to the water space by means permitting free gravitation of water to the latter, the combination of a plurality of steam generating elements, each having a plurality of closely arranged horizontal tube portions lying in the same plane, said elements being located side by side in parallel planes with the horizontal tube portions of adjacent elements staggered with relation to each other, each element having at its lower end a single point of connection with the water space of the generator and at its upper end a single point of connection with the steam space of the generator.

17. In a steam generator having a lower water space and an upper steam space connected to the water space by means permitting the free gravitation of water to the latter, the combination of a plurality of steam generating elements, each having a plurality of closely arranged tube portions lying in the same plane and alternately connected to each other at their opposite ends so as to form a single serpentine passage, said elements being located side by side in parallel planes with the horizontal tube portions of the adjacent elements staggered with relation to each other, each element having at its lower end a single point of connection with the water space of the generator and at its upper end a single point of connection with the steam space of the generator.

In testimony whereof, I have signed my name to this specification, in the presence of two subscribing witnesses.

GEORGE A. WALTON.

Witnesses:
 EDWIN SEGER,
 JOHN O. GEMPLER.